(12) United States Patent
Liu et al.

(10) Patent No.: US 12,407,248 B2
(45) Date of Patent: *Sep. 2, 2025

(54) FEEDFORWARD FREQUENCY RESPONSE FOR RESONANT CHARGE PUMP

(71) Applicant: RICHTEK TECHNOLOGY CORP., Hsinchu County (TW)

(72) Inventors: Kuo-Chi Liu, Hsinchu (TW); Ta-Yung Yang, Taoyuan (TW); Wei-Hsu Chang, New Taipei (TW)

(73) Assignee: RICHTEK TECHNOLOGY CORP., Hsinchu County (TW)

( * ) Notice: Subject to any disclaimer, the term of this patent is extended or adjusted under 35 U.S.C. 154(b) by 339 days.

This patent is subject to a terminal disclaimer.

(21) Appl. No.: 18/123,961

(22) Filed: Mar. 20, 2023

(65) Prior Publication Data

US 2023/0336074 A1   Oct. 19, 2023

Related U.S. Application Data

(60) Provisional application No. 63/330,771, filed on Apr. 13, 2022.

(30) Foreign Application Priority Data

Nov. 1, 2022   (TW) ................................ 111141586

(51) Int. Cl.
 *H02M 3/07* (2006.01)
 *H02M 1/00* (2006.01)

(52) U.S. Cl.
 CPC ........... *H02M 3/07* (2013.01); *H02M 1/0012* (2021.05)

(58) Field of Classification Search
 CPC ...................... H02M 3/07–078; H02M 1/0095
 See application file for complete search history.

(56) References Cited

U.S. PATENT DOCUMENTS

| 9,917,517 | B1 | 3/2018 | Jiang |
| 11,228,256 | B2 | 1/2022 | Zilio |
| 2015/0311784 | A1* | 10/2015 | Saadat ................... H02M 3/07 327/536 |

(Continued)

OTHER PUBLICATIONS

Liu, the specification, including the claims, and drawings in the U.S. Appl. No. 18/131,361, Filing Date: Apr. 5, 2023.

(Continued)

*Primary Examiner* — Peter M Novak
(74) *Attorney, Agent, or Firm* — Winston Hsu

(57) ABSTRACT

A power converter includes first to fourth switches, a flying capacitor, an inductor, an output capacitor and a control circuit. The first to fourth switches are sequentially coupled in cascode. The first switch is used to receive an input voltage. The flying capacitor is coupled across the second switch and the third switch, the inductor is coupled to the second switch, the third switch and the output capacitor. The output capacitor is used to output an output voltage. When the input voltage is less than an input voltage threshold, the control circuit is used to switch the first to fourth switches according to a resonant frequency. When the input voltage exceeds the input voltage threshold, the control circuit switch is used to the first to fourth switches according to a regulated frequency exceeding the resonant frequency.

24 Claims, 9 Drawing Sheets

(56) References Cited

U.S. PATENT DOCUMENTS

2021/0067042 A1    3/2021  Liu
2021/0119465 A1*   4/2021  Choi .................. H02M 1/0095
2021/0399621 A1   12/2021  Liu

OTHER PUBLICATIONS

Yousefzadeh et al., Three-Level Buck Converter for Envelope Tracking in RF Power Amplifiers, Twentieth Annual IEEE Applied Power Electronics Conference and Exposition, pp. 1588-1594, 2005.

* cited by examiner understand # FEEDFORWARD FREQUENCY RESPONSE FOR RESONANT CHARGE PUMP

CROSS REFERENCE TO RELATED APPLICATIONS

This application claims the benefit of U.S. Provisional Application No. 63/330,771, filed on Apr. 13, 2022, and Taiwan Patent Application No. 111141586, filed on Nov. 1, 2022. The content of the applications is incorporated herein by reference.

BACKGROUND OF THE INVENTION

1. Field of the Invention

The invention relates to power conversion, and in particular, to a power converter preventing overvoltage damage and a control method thereof.

2. Description of the Prior Art

A resonant switched-capacitor converter (RSCC) is a power converter that consumes limited or no power during power transfer, and provides power to portable devices such as mobile phones and notebook computers.

The resonant switched-capacitor converter converts an input voltage to an output voltage using a fixed conversion ratio. When the input voltage is too large, the resonant switched-capacitor converter would continue to generate an excessively large output voltage using the fixed conversion ratio, resulting in damage to an electronic device.

SUMMARY OF THE INVENTION

According to an embodiment of the invention, a power converter includes a first switch, a second switch, a third switch, a fourth switch, a flying capacitor, an inductor, an output capacitor and a control circuit. The first switch includes a control terminal, a first terminal configured to receive an input voltage, and a second terminal. The second switch includes a control terminal, a first terminal coupled to the second terminal of the first switch, and a second terminal. The third switch includes a control terminal, a first terminal coupled to the second terminal of the second switch, and a second terminal. The fourth switch includes a control terminal, a first terminal coupled to the second terminal of the third switch, and a second terminal coupled to a ground terminal. The flying capacitor includes a first terminal coupled to the second terminal of the first switch, and a second terminal coupled to the second terminal of the third switch. The inductor includes a first terminal coupled to the second terminal of the second switch, and a second terminal. The output capacitor includes a first terminal coupled to the second terminal of the inductor and configured to output an output voltage, and a second terminal coupled to the ground terminal. The control circuit is coupled to the control terminal of the first switch, the control terminal of the second switch, the control terminal of the third switch and the control terminal of the fourth switch, and is used to switch the first switch, the second switch, the third switch and the fourth switch according to a resonant frequency when the input voltage is less than an input threshold voltage, and switch the first switch, the second switch, the third switch and the fourth switch according to a regulated frequency exceeding the resonant frequency when the input voltage exceeds the input threshold voltage. If the flying capacitor is coupled to the inductor, the flying capacitor and the inductor form a resonant circuit having the resonant frequency.

According to another embodiment of the invention, a method of controlling the power converter includes the control circuit switching the first switch, the second switch, the third switch and the fourth switch according to a resonant frequency when the input voltage is less than an input threshold voltage, and the control circuit switching the first switch, the second switch, the third switch and the fourth switch according to a regulated frequency exceeding the resonant frequency when the input voltage exceeds the input threshold voltage, wherein if the flying capacitor is coupled to the inductor, the flying capacitor and the inductor form a resonant circuit having the resonant frequency.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
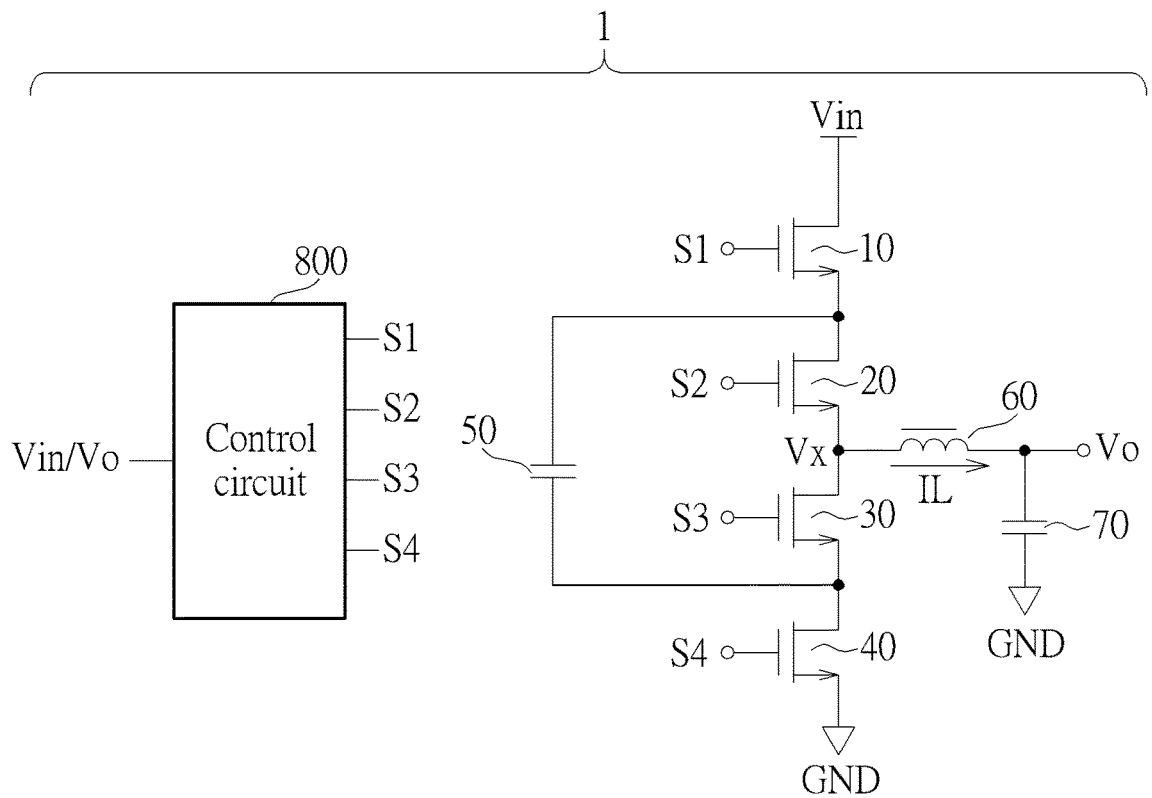
FIG. 1 is a circuit schematic of a power converter according to an embodiment of the invention.

FIG. 1 is a circuit schematic of a power converter 1 according to an embodiment of the invention. The power converter 1 may step down an input voltage Vin to generate an output voltage Vo and output the output voltage Vo to the load. Both the input voltage Vin and the output voltage Vout may be direct current (DC) voltages, and the output voltage Vout may be less than or equal to half the input voltage Vin. The power converter 1 may operate in a non-regulated mode or a regulated mode. When the input voltage Vin is less than an input threshold voltage, the power converter 1 may operate in the non-regulated mode to generate a divided voltage of the input voltage Vin as the output voltage Vo. For example, the output voltage Vo may be equal to half the input voltage Vin, and the input threshold voltage may be 40V When the input voltage Vin exceeds the input threshold voltage, the power converter 1 may operate in the regulated mode to regulate the output voltage Vo, keeping the output voltage Vo equal to or less than an upper output limit. In some embodiments, the upper output limit may be equal to half the input threshold voltage. For example, the input threshold voltage may be 40V, and the upper output limit may be 20V. If the input voltage Vin is 30V, the power converter 1 may generate an output voltage Vo of 15V, and if the input voltage Vin is 60V, the power converter 1 may adjust the output voltage Vo to equal to or less than 20V, preventing the load from being damaged while enhancing system efficiency. The power converter 1 may operate in a discontinuous conduction mode (DCM) but not in a continuous conduction mode (CCM) regardless of operating in the non-regulated mode or the regulated mode.

The power converter 1 may include a switch 10, a switch 20, a switch 30, a switch 40, a flying capacitor 50, an inductor 60, an output capacitor 70 and a control circuit 800. The switch 10 includes a control terminal configured to receive the switch signal S1, a first terminal, and a second terminal. The switch 20 includes a control terminal configured to receive the switch signal S2, a first terminal coupled to the second terminal of the switch 10, and a second terminal. The switch 30 includes a control terminal configured to receive the switch signal S3, a first terminal coupled to the second terminal of the switch 20, and a second terminal. The switch 40 includes a control terminal configured to receive the switch signal S4, a first terminal coupled to the second terminal of the switch 30, and a second terminal coupled to a ground terminal. The flying capacitor 50 includes a first terminal coupled to the second terminal of the switch 10, and a second terminal coupled to the second terminal of the switch 30. The inductor 60 includes a first terminal coupled to the second terminal of the switch 20, and a second terminal. The output capacitor 70 includes a first terminal coupled to the second terminal of the switch 60, and a second terminal coupled to the ground terminal. The control circuit 800 may be coupled to the control terminal of the switch 10, the control terminal of the switch 20, the control terminal of the switch 30 and the control terminal of the switch 40.

The first terminal of the switch 10 may receive the input voltage Vin, and the first terminal of the output capacitor 70 may output the output voltage Vo. The ground terminal may provide a ground voltage GND such as 0 V The second terminal of the switch 20 may provide a switching voltage Vx. The current flowing through the inductor 60 may be referred to as an inductor current IL.

The control circuit 800 may receive the input voltage Vin and/or the output voltage Vo to generate switch signals S1 to S4 for switching the switches 10, 20, 30 and 40, respectively. When the input voltage Vin is less than the input threshold voltage, the control circuit 800 may switch the switches 10, 20, 30 and 40 according to a resonant frequency when the inductor current IL of the inductor 60 reaches 0A, thereby reducing the power loss. When the input voltage Vin exceeds the input threshold voltage, the control circuit 80 may reduce an ON time of the switch 10 or the switch 20, and increase an overlapping ON time of the switch 30 and the switch 40, so as to switch the switches 10, 20, 30 and 40 according to an regulated frequency exceeding the resonant frequency, thereby adjusting the output voltage Vo to equal to or less than the upper output limit. In some embodiments, when the input voltage Vin exceeds the input threshold voltage, the control circuit 800 may turn off the switch 10 or the switch 20 when magnetizing the inductor 60 before the inductor current IL of the inductor 60 reaches 0. Then, after turning off the switch 10 or the switch 20, the control circuit 800 may turn on the switch 30 and the switch 40 to demagnetize the inductor 60, and when the inductor 60 is demagnetized, the control circuit 800 may turn off the switch 30 or the switch 40 when the inductor current IL of the inductor 60 reaches 0A. In some embodiments, when the power converter 1 is in a light load condition, the control circuit 800 may further increase the OFF time of the switches 10, 20, 30 and 40.

While the power converter 1 compares the input voltage Vin and the input threshold voltage to determine the operation mode of the power converter 1 in the embodiment, those skilled in the art may also change the circuit configuration of the power converter 1 to compare the output voltage Vo and the upper output limit based on the actual requirements to determine the operation mode of the power converter 1. For example, when the output voltage Vo is less than the upper output limit, the power converter 1 may operate in the non-regulated mode. When the output voltage Vo exceeds the upper output limit, the power converter 1 may operate in the regulated mode.

Figure 2:
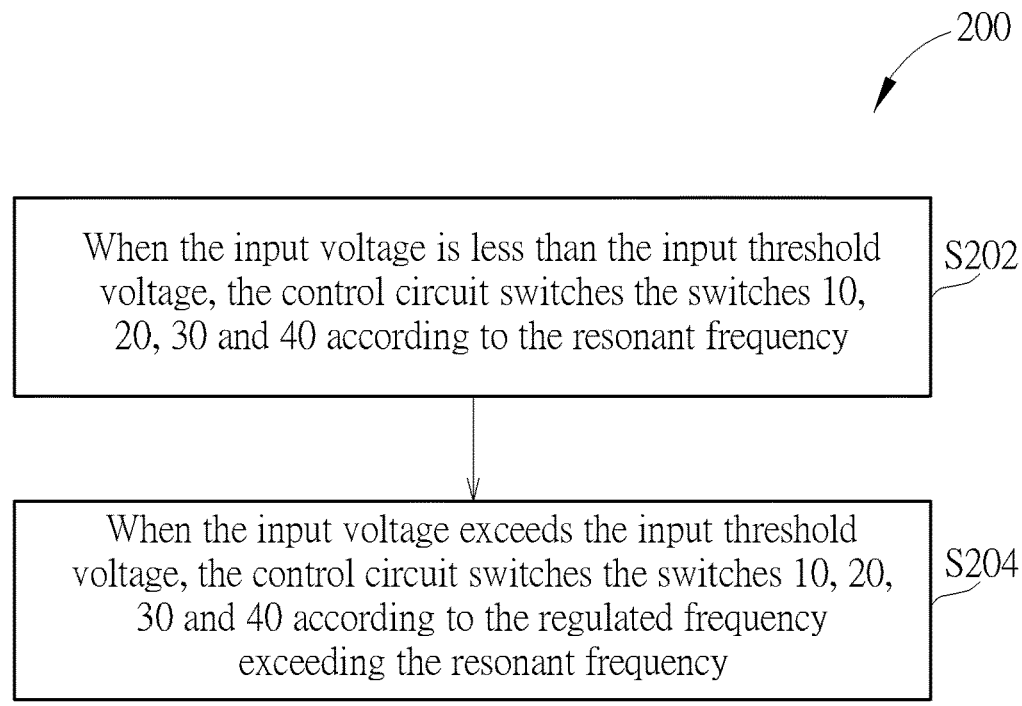
FIG. 2 is a flowchart of a method of controlling the power converter in FIG. 1.

FIG. 2 is a flowchart of a method 200 of controlling the power converter 1. The method 200 includes Steps S202 and S204 for controlling the power converter 1 to operate in the non-regulated mode or the regulated mode. Any reasonable step change or adjustment is within the scope of the disclosure. Steps S202 and S204 are detailed as follows:

Step S202: When the input voltage Vin is less than the input threshold voltage, the control circuit 800 switches the switches 10, 20, 30 and 40 according to the resonant frequency;

Step S204: When the input voltage Vin exceeds the input threshold voltage, the control circuit 800 switches the switches 10, 20, 30 and 40 according to the regulated frequency exceeding the resonant frequency.

Figure 3:
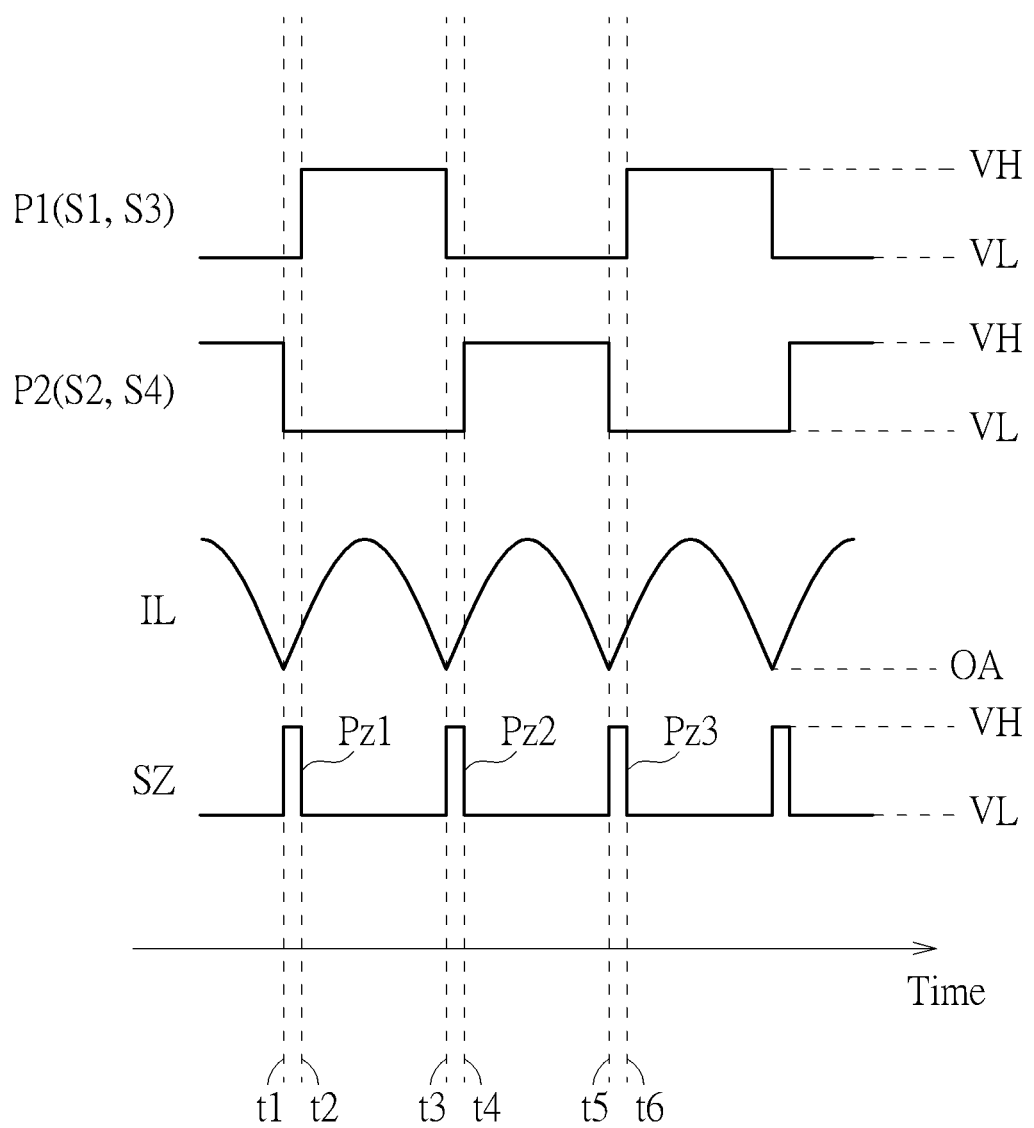
FIG. 3 shows waveforms of the power converter in FIG. 1 in a non-regulated mode.

In Step S202, the power converter 1 is operated in the non-regulated mode, and the resonant frequency may be generated by a resonant circuit including the flying capacitor 50 and the inductor 60 as the flying capacitor 50 and the inductor 60 are coupled together. The switch signals S1 and S3 may be identical to simultaneously switch the switches 10 and 30, and the switch signals S2 and S4 may be identical to simultaneously switch and the switches 20 and 40 as in FIG. 3. FIG. 3 shows waveforms of the power converter 1 in the non-regulated mode, where the horizontal axis represents time and the vertical axis represents voltage or current. The operations of the non-regulated mode for the power converter 1 will be described below with reference to both FIG. 1 and FIG. 3. In the non-regulated mode, the control circuit 800 may use a phase signal P1 to generate the switch signals S1 and S3, use a phase signal P2 to generate the switch signals S2 and S4, generate a zero-crossing signal SZ according to the inductor current IL, and switch the phase signals P1 and P2 according to the zero-crossing signal SZ, thereby achieving zero-current switching (ZCS). The phase signal P1 and the switch signals S1 and S3 may be identical, and the phase signal P2 and the switch signals S2 and S4 may be identical. The generation of the phase signals P1 and P2 will be described in detail in the following paragraphs.

At Time t1, the inductor current IL reaches 0A, starting a pulse Pz1 in the zero-crossing signal SZ. The pulse Pz1 triggers the phase signal P2 to switch from the high voltage VH to the low voltage VL, while the phase signal P1 remains at the low voltage VL. The low voltage VL may be the ground voltage GND. At Time t2, the phase signal P1 switches from the low voltage VL to the high voltage VH, the phase signal P2 remains at the low voltage VL, and the pulse Pz1 ends. The pulse Pz1 may have a predetermined width, e.g., equal to (t2-t1).

Between Time t2 and Time t3, the phase signal P1 is maintained at the high voltage VH, the phase signal P2 is maintained at the low voltage VL, the inductor current IL oscillates at the resonant frequency, and the zero-crossing signal SZ is maintained at the low voltage VL. The switch signals S1 and S3 (=phase signal P1) may be the high voltage VH to turn on the switches 10 and 30, and the switch signals S2 and S4 (=phase signal P2) may be the low voltage VL to turn off the switches 20 and 40, thereby enabling the first terminal of the flying capacitor 50 to receive the input voltage Vin via the switch 10, and coupling the second terminal of the flying capacitor 50 to the first terminal of the inductor 60 via the switch 30. Therefore, the input voltage Vin charges the flying capacitor 50 and the output capacitor 70 and magnetizes the inductor L. Meanwhile, the flying capacitor 50 and the output capacitor 70 may form a voltage divider to generate the output voltage Vo, and the flying capacitor 50 and the inductor L 60 may form a resonant circuit to enable the inductor current IL to oscillate at the resonant frequency. In some embodiments, the capacitances of the flying capacitor 50 and the output capacitor 70 may be equal, resulting in equal voltages across the flying capacitor 50 and the output capacitor 70, and setting the switching voltage Vx and the output voltage Vo both to equal to half the input voltage Vin.

At Time t3, the inductor current IL reaches 0A, starting a pulse Pz2 in the zero-crossing signal SZ. The pulse Pz2 triggers the phase signal P1 to switch from the high voltage VH to the low voltage VL, while the phase signal P2 remains at the low voltage VL. At Time t4, the phase signal P2 switches from the low voltage VL to the high voltage VH, the phase signal P1 remains at the low voltage VL, and the pulse Pz2 ends. The pulse Pz2 may have the same predetermined width as the pulse Pz1, e.g., the predetermined width (t4-t3) of the pulse Pz2 is equal to the predetermined width (t2-t1) of the pulse Pz1.

Between Time t4 and Time t5, the phase signal P1 is maintained at the low voltage VL, the phase signal P2 is maintained at the high voltage VH, the inductor current IL oscillates at the resonant frequency, and the zero-crossing signal SZ is maintained at the low voltage VL. The switch signals S1 and S3 (=phase signal P1) may be the low voltage VL to turn off the switches 10 and 30, and the switch signals S2 and S4 may be the high voltage VH to turn on the switches 20 and 40, thereby coupling the first terminal of the flying capacitor 50 to the first terminal of the inductor 60 via the switch 20, and coupling the second terminal of the flying capacitor 50 to the ground terminal via the switch 40. The flying capacitor 50 may be used as a voltage source to charge the output capacitor 70 and magnetize the inductor L, and thus, the voltage across the flying capacitor 50 may be equal to the output voltage Vo. If the voltage across the flying capacitor 50 is equal to half the input voltage Vin, the output voltage Vo is also equal to half of the input voltage Vin. Meanwhile, the flying capacitor 50 and the inductor 60 may form the resonant circuit to enable the inductor current IL to oscillate at the resonant frequency.

At Time t5, the inductor current IL reaches 0A, starting a pulse Pz3 in the zero-crossing signal SZ. The pulse Pz3 triggers the phase signal P2 to switch from the high voltage VH to the low voltage VL, while the phase signal P1 remains at the low voltage VL. At Time t6, the phase signal P1 switches from the low voltage VL to the high voltage VH, the phase signal P2 remains at the low voltage VL, and the pulse Pz3 ends. The pulse Pz3 may have the same predetermined width as the pulse Pz1, e.g., the predetermined width (t6-t5) of the pulse Pz3 is equal to the predetermined width (t2-t1) of the pulse Pz1.

Later, if the input voltage Vin is less than the input threshold voltage, the power converter 1 will continue to switch the switches 10, 20, 30 and 40 according to the resonant frequency to repeat the waveforms from time t2 to t6, thereby outputting the output voltage Vo to the load.

Figure 4:
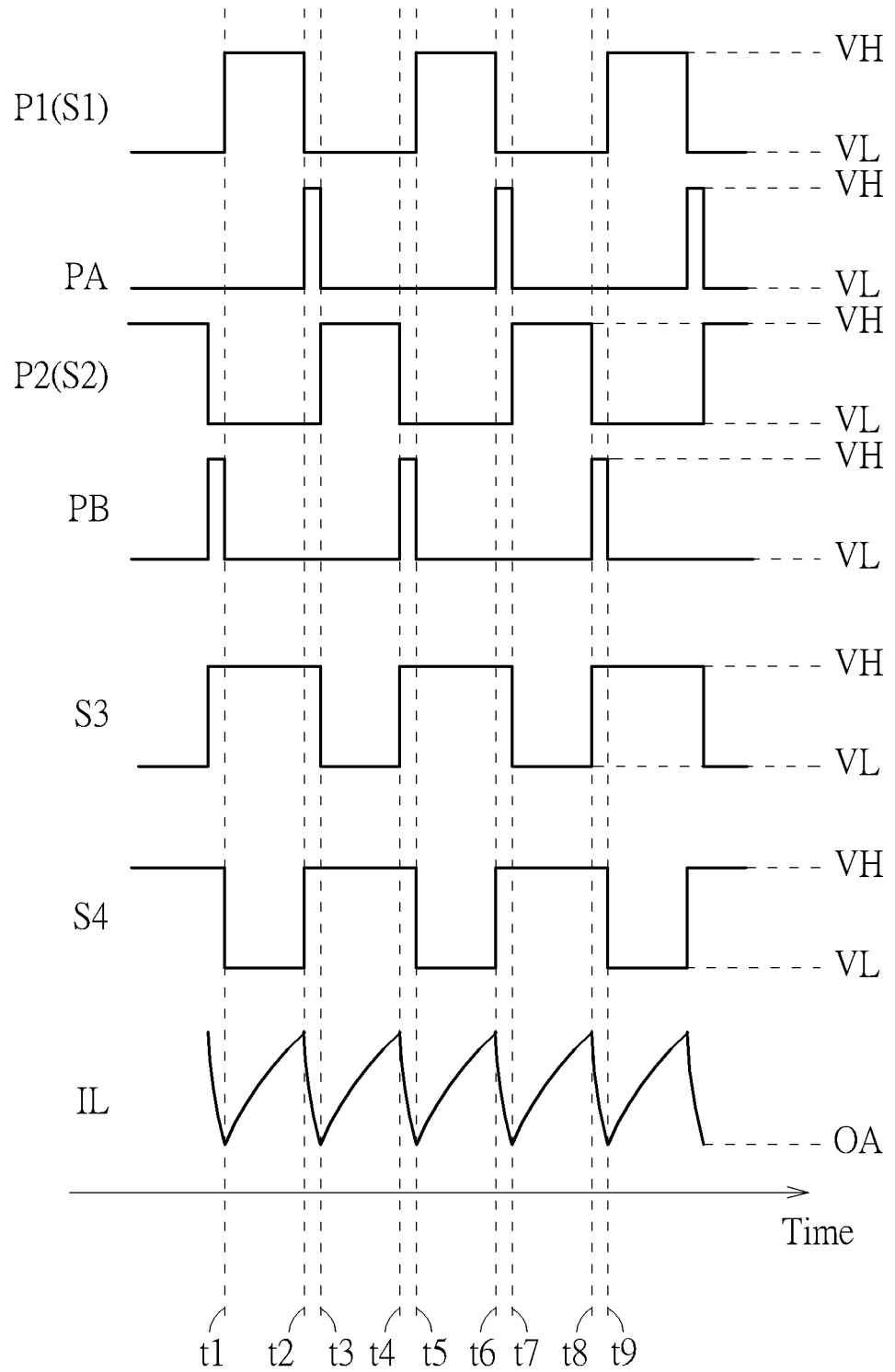
FIG. 4 shows waveforms of the power converter in FIG. 1 in a regulated mode.

In Step S204, the power converter 1 is operated in the regulated mode, and the switch signals S1 to S4 may be different as shown in FIG. 4. FIG. 4 shows waveforms of the power converter 1 in the regulated mode, wherein the horizontal axis represents time and the vertical axis represents voltage or current. The operation of the regulated mode for the power converter 1 will be described below with reference to both FIG. 1 and FIG. 4. In the regulated mode, the control circuit 800 may generate the switch signal S1 according to the phase signal P1, generate the switch signal S2 according to the phase signal P2, generate the switch signal S3 according to the phase signals P1, PA and PB, and generate the switch signal S4 according to the phase signals P2, PA and PB. The switch signal S1 may be identical to the phase signal P1, the switch signal S2 may be identical to the phase signal P2, the switch signal S3 may be the result of an OR operation of the phase signals P1, PA and PB, and the switch signal S4 may be the result of an OR operation of the phase signals P2, PA and PB. The generation method of the phase signals P1, P2, PA and PB will be explained in the following paragraphs.

At Time t1, the inductor current IL reaches 0A, starting the phase signal PB to switch from the high voltage VH to the low voltage VL and the phase signal P1 to switch from the low voltage VL to the high voltage VH, while the phase signals PA and P2 are maintained at the low voltage VL, resulting in the switch signal S1 being switched from the low voltage VL to the high voltage VH, the switch signal S2 being maintained at the low voltage VL, the switch signal S3 being maintained at the high voltage VH, and the switch signal S4 being switched from the high voltage VH to the low voltage VL, and thus, the switch 40 is turned off when the inductor current IL reaches 0A.

Between Time t1 and Time t2, the switch signals S1 and S3 are maintained at the high voltage VH, and the switch signals S2 and S4 are maintained at the low voltage VL. Thus, the switches 10 and 30 are turned on and the switches 20 and 40 are turned off, the first terminal of the flying capacitor 50 receives the input voltage Vin via the switch 10, and the second terminal of the flying capacitor 50 is coupled to the first terminal of the inductor 60 via the switch 30. Therefore, the input voltage Vin charges the flying capacitor 50 and the output capacitor 70 and magnetizes the inductor L, while the flying capacitor 50 and the inductor 60 form a resonant circuit to enable the inductor current IL to rise.

At Time t2, the input voltage Vin exceeds the input threshold voltage, starting the phase signal P1 to switch from the high voltage VH to the low voltage VL and the phase signal PA to switch from the low voltage VL to the high voltage VH, while the phase signals P2 and PB are maintained at the low voltage VL, resulting in the switch signal S1 being switched from the high voltage VH to the low voltage VL, the switch signal S2 being maintained at the low voltage VL, the switch signal S3 being maintained at the high voltage VH, and the switch signal S4 being switched from the low voltage VL to the high voltage VH. Consequently, the control circuit 800 turns off the switch 10 prior to the inductor current IL of the inductor 60 reaching 0A when the inductor 60 is magnetized, thereby reducing the ON time of the switch 10.

Between Time t2 and Time t3, the switch signals S1 and S2 are maintained at the low voltage VL, and the switch signals S3 and S4 are maintained at the high voltage VH, turning off the switches 10 and 20 and turning on the switches 30 and 40. Consequently, and the first terminal of the inductor 60 is coupled to the ground terminal via the switches 30 and 40 to demagnetize the inductor 60, pulling down to 0A prior to the inductor current IL reaching a peak value. Since the inductor 60 is coupled to the ground terminal, the decreasing speed of the inductor current IL in FIG. 4 is much larger than the decreasing speed of the inductor current IL owing to the resonance in FIG. 3, and the time (=t3-t1) for magnetizing and demagnetizing the inductor 60 once in FIG. 4 is less than the time (=t3-t1) for magnetizing and demagnetizing the inductor 60 once in FIG. 3, and thus, the control circuit 800 switches the switches 10, 20, 30 and 40 according to the regulated frequency exceeding the resonant frequency.

At Time t3, the inductor current IL reaches 0A, starting the phase signal PA to switch from the high voltage VH to the low voltage VL and the phase signal P12 to switch from the low voltage VL to the high voltage VH, while the phase signals PB and P1 are maintained at the low voltage VL, resulting in the switch signal S1 being maintained at the low voltage VL, the switch signal S2 being switched from the low voltage VL to the high voltage VH, the switch signal S3 being switched from the high voltage VH to the low voltage VL, and the switch signal S4 being maintained at the high voltage VH, and thus, the switch 30 is turned off when the inductor current IL reaches 0A.

Between Time t3 and Time t4, the switch signals S2 and S4 are maintained at the high voltage VH, and the switch signals S1 and S3 are maintained at the low voltage VL, and thus, the switches 20 and 40 are turned on and the switches 10 and 30 are turned off, the first terminal of the flying capacitor 50 is coupled to the first terminal of the inductor 60 via the switch 20, and the second terminal of the flying capacitor 50 receives the input voltage Vin via the switch 40. The flying capacitor 50 may serve as a voltage source to charge the output capacitor 70 and magnetize the inductor L, and the flying capacitor 50 and the inductor 60 may form a resonant circuit to enable the inductor current IL starting to rise.

At Time t4, the input voltage Vin exceeds the input threshold voltage, starting the phase signal P2 to switch from the high voltage VH to the low voltage VL and the phase signal PB to switch from the low voltage VL to the high voltage VH, while the phase signals P1 and PA are maintained at the low voltage VL, resulting in the switch signal S1 being maintained at the low voltage VL, the switch signal S2 being switch from the high voltage VH to the low voltage VL, the switch signal S3 being switched from the low voltage VL to the high voltage VH, and the switch signal S4 being maintained at the high voltage VH. Consequently, the control circuit 800 turns off the switch 20 prior to the inductor current IL of the inductor 60 reaching 0A when the inductor 60 is magnetized, thereby reducing the ON time of the switch 20 and switching the switch 20 at the regulated frequency exceeding the resonant frequency.

Between Time t4 and Time t5, the switch signals S1 and S2 are maintained at the low voltage VL, and the switch signals S3 and S4 are maintained at the high voltage VH, turning off the switches 10 and 20 and turning on the switches 30 and 40. Consequently, and the first terminal of the inductor 60 is coupled to the ground terminal via the switches 30 and 40 to demagnetize the inductor 60, pulling down to 0A prior to the inductor current IL reaching a peak value. Since the inductor 60 is coupled to the ground terminal, the decreasing speed of the inductor current IL in FIG. 4 is much larger than the decreasing speed of the inductor current IL owing to the resonance in FIG. 3, and the time (=t5-t3) for magnetizing and demagnetizing the inductor 60 once in FIG. 4 is less than the time (=t5-t3) for magnetizing and demagnetizing the inductor 60 once in FIG. 3, and thus, the control circuit 800 switches the switches 10, 20, 30 and 40 according to the regulated frequency exceeding the resonant frequency.

In some embodiments, when the power converter 1 is in a light load condition, the control circuit 800 may increase the dead-time delays between pulses of the phase signals P1 and PA, PA and P2, P2 and PB, and PB and P1), thereby increasing the OFF times of the switches 10, 20, 30 and 40, thereby achieving power saving. When there are dead-time delays between the pulses of the phase signal P1 and PA, PA and P2, P2 and PB, PB and P1, each pulse of the switch signals S3 and S4 in FIG. 4 may be replaced by three sub-pulses. For example, the start time of the first sub-pulse of the switch signal S3 may be later than the start time of the original pulse of the switch signal S3 in FIG. 4, and the end time of the third sub-pulse of the switch signal S3 may be later than the end time of the original pulse of the switch signal S3 in FIG. 4, the pulse width of each sub-pulse is less than the pulse width of each original pulse in the switch signal S3 in FIG. 4, and there may be a time interval between two adjacent sub-pulses. Similarly, the start time of the first sub-pulse of the switch signal S4 may be later than the start time of the original pulse of the switch signal S4 in FIG. 4, and the end time of the third sub-pulse of the switch signal S4 may be later than the end time of the original pulse of the switch signal S4 in FIG. 4, the pulse width of each sub-pulse is less than the pulse width of each original pulse in the switch signal S4 in FIG. 4, and there may be a time interval between two adjacent sub-pulses.

The waveforms from Time t5 to Time t9 and thereafter are similar to Time t1 to Time t5, and the explanation therefor may be found in the preceding paragraphs, and will not be repeated here for brevity. The higher the input voltage Vin is, the faster the control circuit 800 turns off the switch 10 or 20 and switch the switches 10, 20, 30 and 40, setting the output voltage Vo to equal to or less than the upper output limit, achieving regulation of the output voltage Vo, preventing the load from being damaged, and enhancing the system efficiency.

Figure 5:
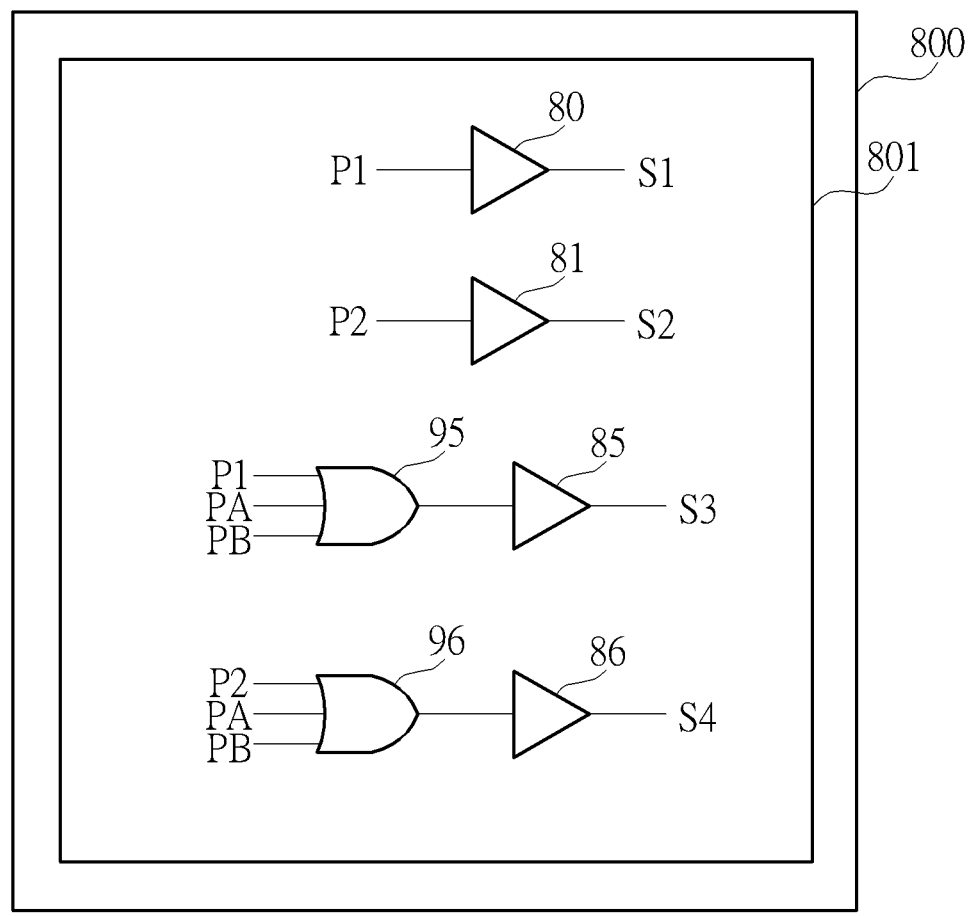
FIG. 5 is a circuit schematic of a portion of the control circuit in FIG. 1.

FIG. 5 is a circuit schematic of a portion of the control circuit 800. The control circuit 800 may include a signal generation circuit 801. The signal generation circuit 801 may generate the switch signals S1 to S4 according to the phase signals P1, P2, PA and PB. The signal generation circuit 801 may include buffers 80, 81, 85 and 86, and OR gates 95 and 96.

The buffer 80 includes an input terminal configured to receive the phase signal P1, and an output terminal configured to output the switch signal S1. The phase signal P1 passes the buffer 80 to generate the switch signal S1, and thus, the switch signal S1 may show a delayed waveform of the phase signal P1.

The buffer 81 includes an input terminal configured to receive the phase signal P2, and an output terminal configured to output the switch signal S2. The phase signal P2 passes the buffer 81 to generate the switch signal S2, and thus, the switch signal S2 may show a delayed waveform of the phase signal P2.

The OR gate 95 includes a first input terminal configured to receive the phase signal P1, a second input terminal configured to receive the phase signal PA, a third input terminal configured to receive the phase signal PB, and an output terminal configured to output the result of an OR operation of the phase signals P1, PA and PB. When any one of the phase signals P1, PA and PB is the high voltage VH, the OR gate 95 outputs the high voltage VH. When all of the phase signals P1, PA and PB are at the low voltage VL, the OR gate 95 outputs the low voltage VL. The buffer 85 includes an input terminal configured to receive the output of the OR gate 95, and an output terminal configured to output the switch signal S3. The output of the OR gate 95 may be used to generate the switch signal S3 via the buffer 85, and thus, the switch signal S3 may show a delayed waveform of the output of the OR gate 95.

The OR gate 96 includes a first input terminal configured to receive the phase signal P2, a second input terminal configured to receive the phase signal PA, a third input terminal configured to receive the phase signal PB, and an output terminal configured to output the result of an OR operation of the phase signals P2, PA and PB. When any one of the phase signals P2, PA and PB is the high voltage VH, the OR gate 95 outputs the high voltage VH. When all of the phase signals P2, PA and PB are at the low voltage VL, the OR gate 95 outputs the low voltage VL. The buffer 86 includes an input terminal configured to receive the output of the OR gate 96, and an output terminal configured to output the switch signal S4. The output of the OR gate 96 may be used to generate the switch signal S4 via the buffer 86, and thus, the switch signal S4 may show a delayed waveform of the output of the OR gate 96.

Figure 6:
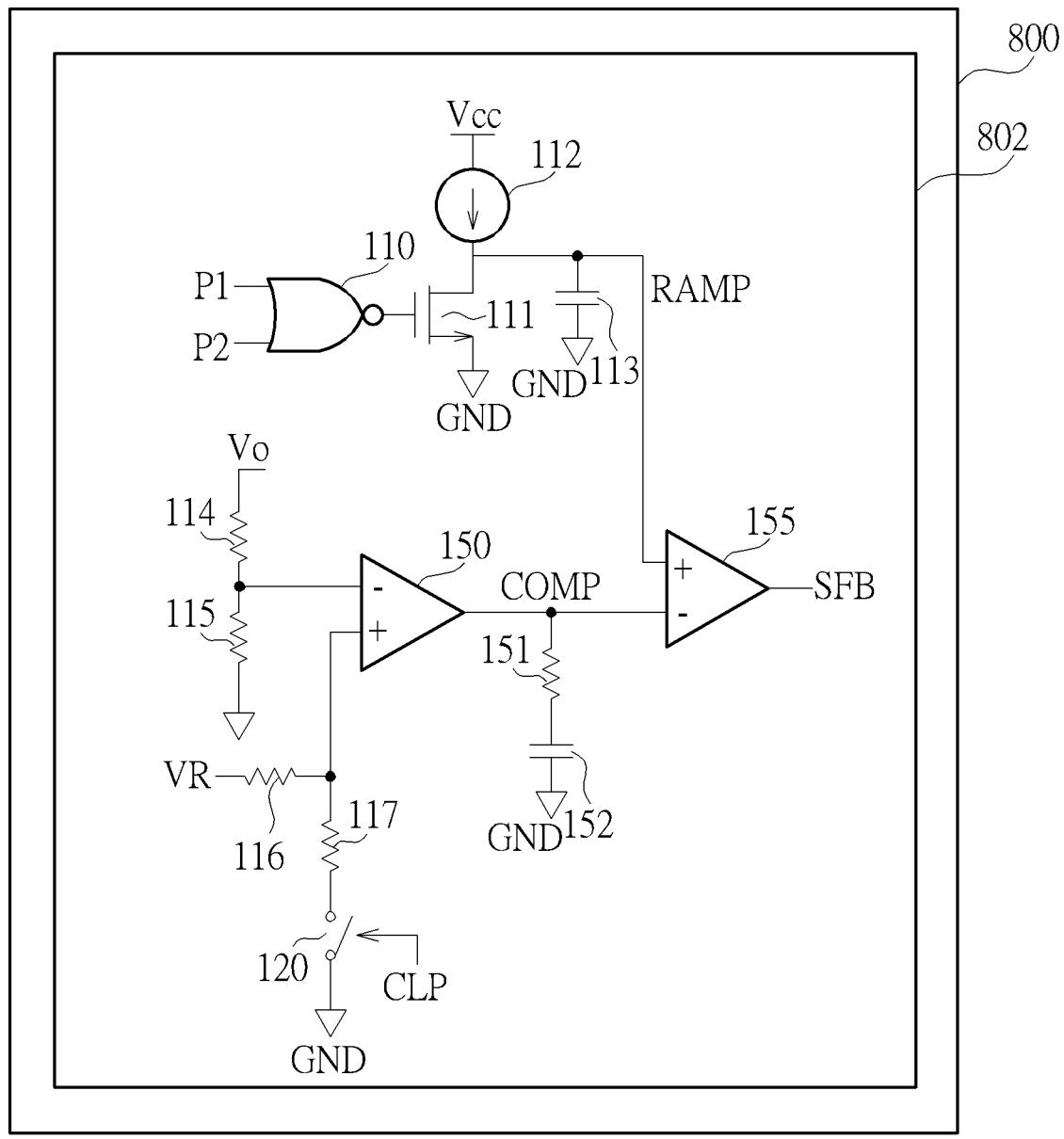
FIG. 6 is a circuit schematic of another portion of the control circuit in FIG. 1.

FIG. 6 is a circuit schematic of another portion of the control circuit 800. The control circuit 800 may further include a feedback circuit 802. The feedback circuit 802 may generate the feedback signal SFB to adjust the output voltage Vo. The feedback signal SFB may indicate that the input voltage Vin exceeds the input threshold voltage and/or the output voltage Vo exceeds the upper output limit, and may be used to perform an early reset on the phase signals P1 and/or P2 for setting the same to the low voltage VL, thereby reducing the ON times of the switches 10 and/or 20 and increasing the regulated frequency. The feedback circuit 802 may include a NOR gate 110, a current source 112, a transistor 111, capacitors 113 and 152, resistors 114, 115, 116, 117 and 151, a switch 120, an error amplifier 150 and a comparator 155.

The NOR gate 110 includes a first input terminal configured to receive the phase signal P1, a second input terminal configured to receive the phase signal P2, and an output terminal configured to output the result of the OR operation of the phase signals P1 and P2. The current source 112 includes a first terminal coupled to the supply terminal and configured to receive the supply voltage Vcc, and a second terminal. The transistor 111 includes a control terminal coupled to the output terminal of the NOR gate 110 and configured to receive the output of the NOR gate 110, a first terminal coupled to the second terminal of the current source 112, and a second terminal coupled to the ground terminal. The capacitor 113 includes a first terminal coupled to the first terminal of the transistor 111, and a second terminal coupled to the ground terminal. The NOR gate 110, the current source 112, the transistor 111 and the capacitor 113 may form a ramp circuit. When the phase signal P1 or the phase signal P2 is at the high voltage VH, the ramp circuit may generate a gradually rising ramp signal RAMP. When the phase signal P1 and/or the phase signal P2 are both at the low voltage VL, the ramp circuit may reset the ramp signal RAMP to the ground voltage GND.

The resistor 114 includes a first terminal configured to receive the output voltage Vo, and a second terminal. The resistor 115 includes a first terminal coupled to the second end of the resistor 114, and a second terminal coupled to the ground terminal. The resistor 116 includes a first terminal configured to receive the reference voltage VR, and a second terminal. The reference voltage VR may be set to 2V or other suitable value. The resistor 117 includes a first terminal coupled to the second terminal of the resistor 116, and a second terminal. The switch 120 includes a control terminal configured to receive a closed-loop signal CLP, a first terminal coupled to the second terminal of the resistor 116, and a second terminal coupled to the ground terminal. The resistors 114 and 115 may form a voltage divider configured to generate a divided voltage according to the output voltage Vo. For example, the resistance of the resistor 114 may be 9 k ohms, and the resistance of the resistor 115 may be 1 k ohms, enabling the voltage divider to operate at a voltage division ratio of 10:1. If the output voltage Vo is 20V, the first terminal of the resistor 115 may output 2V as the divided voltage of the output voltage Vo. The error amplifier 150 includes an inverting terminal coupled to the second terminal of the resistor 114, a non-inverting terminal coupled to the second terminal of the resistor 116, and an output terminal. The resistor 151 includes a first terminal coupled to the output terminal of the error amplifier 150, and a second terminal. The capacitor 152 includes a first terminal coupled to the second terminal of the resistor 114, and a second terminal coupled to the ground terminal. When the closed-loop signal CLP is at the low voltage VL, the switch 120 may be turned off, and the error amplifier 150 may compare the divided voltage of the output voltage Vo to the reference voltage VR to generate an error amplification signal COMP. The error amplification signal COMP may be a stable voltage level correlated to the output voltage Vo. If the divided voltage of the output voltage Vo exceeds the reference voltage VR, the error amplification signal COMP will decrease, and if the divided voltage of the output voltage Vo is less than the reference voltage VR, the error amplification signal COMP will increase. For example, if the reference voltage VR is 2V and the divided voltage of the output voltage Vo is 2V, the error amplifier 150 may set the error amplification signal COMP to 3V. If the reference voltage VR is 2V and the divided voltage of the output voltage Vo is 2.2V, the error amplifier 150 may set the error amplifying signal COMP to 2.8V. If the reference voltage VR is 2V and the divided voltage of the output voltage Vo is 1.8V, the error amplifier 150 may set the error amplifying signal COMP to 3.2V.

The closed-loop signal CLP may indicate the operation mode of the power converter 1. If the closed-loop signal CLP is at the low voltage VL, the power converter 1 is operated in the non-regulated mode, and if the closed-loop signal CLP is at the high voltage VH, the power converter 1 is operated in the regulated mode. When the closed-loop signal CLP is at the high voltage VH, the switch 120 may be turned on, and the resistors 116 and 117 may form a voltage divider configured to generate a divided voltage according to the reference voltage VR. The error amplifier 150 may compare the divided voltage of the output voltage Vo and the divided voltage of the reference voltage VR to generate the amplified error amplification signal COMP. For example, the resistance of the resistor 116 may be 1 k ohms, and the resistance of the resistor 117 may be 9 k ohms, enabling the voltage divider to provide a voltage division ratio of 10:9. If the reference voltage VR is 2V, the first terminal of the resistor 177 may output 1.8V as the divided voltage of the reference voltage VR. The error amplifier 150 may reduce the level of the error amplification signal COMP when the divided voltage of the output voltage Vo exceeds 1.8V, and increase the level of the error amplification signal COMP when the divided voltage of the output voltage Vo is less than 1.8V The closed-loop signal CLP may provide a hysteresis control for the reference voltage VR. The resistor 151 and the capacitor 152 may form a low-pass filter to filter the error amplification signal COMP. In some embodiments, the resistor 151 and the capacitor 152 may be omitted, and the error amplification signal COMP may be directly input to the comparator 155.

The comparator 155 includes a non-inverting terminal coupled to the first terminal of the capacitor 113, an inverting terminal coupled to the first terminal of the resistor 151, and an output terminal configured to output a feedback signal SFB. The comparator 155 may compare the ramp signal RAMP and the error amplification signal COMP. When the ramp signal RAMP is less than the error amplification signal COMP, the comparator 155 may set the feedback signal SFB to the low voltage VL, and once the ramp signal RAMP reaches the error amplification signal COMP, the comparator 155 may insert a positive pulse having a predetermined width into the feedback signal SFB.

According to the preceding paragraphs, if the divided voltage of the output voltage Vo exceeds the reference voltage VR, the error amplification signal COMP will decrease, enabling the ramp signal RAMP to reach the error amplification signal COMP in less time, thereby speeding up the generation of the feedback signal SFB. Further, when the closed-loop signal CLP is at the high voltage VH, the error amplification signal COMP may be further reduced, enabling the ramp signal RAMP to reach the error amplification signal COMP in even less tie, thereby generating the feedback signal SFB in a faster and stable manner, increasing the reliability of the feedback signal SFB.

Figure 7:
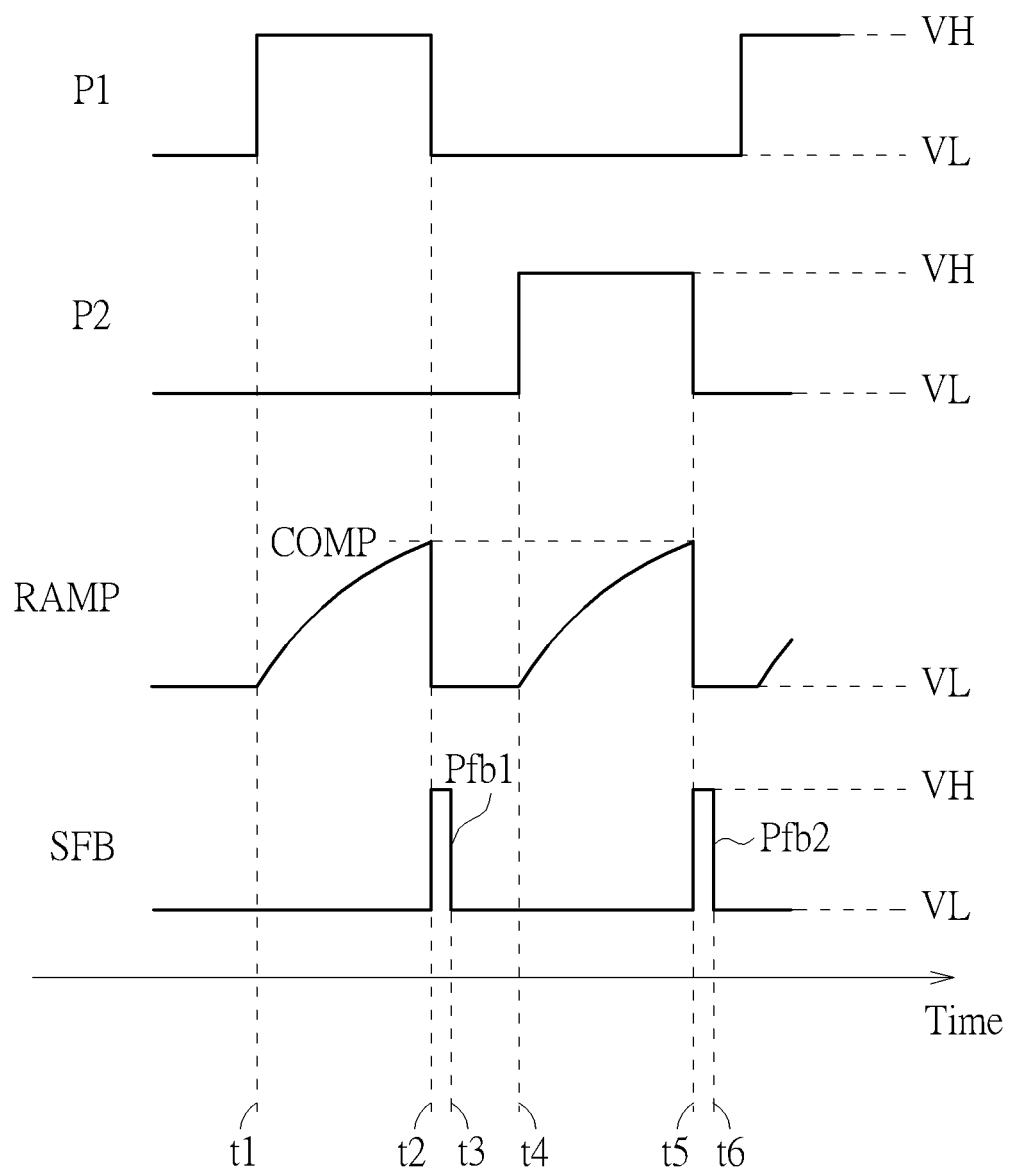
FIG. 7 shows waveforms of the circuit in FIG. 6.

FIG. 7 is a waveform diagram of the feedback circuit 802, where the horizontal axis represents time and the vertical axis represents voltage. The operation method of the RC circuit 802 will be explained with reference to FIG. 7.

Between Time t1 and Time t2, the phase signal P1 is at the high voltage VH, triggering the ramp signal RAMP to rise, while the phase signal P2 and the feedback signal SFB are maintained at the low voltage VL simultaneously. At Time t2, the ramp signal RAMP is equal to the error amplification signal COMP, starting the generation of the pulse Pfb1 in the feedback signal SFB. The pulse Pfb1 in turn sets the phase signal P1 to the low voltage VL. Since the phase signals P1 and P2 are both at the low voltage VL, the ramp signal RAMP is reset to the low voltage VL. At Time t3, the pulse Pfb1 ends, and the phase signals P1 and P2 and the ramp signal RAMP are maintained at the low voltage VL. Between Time t3 and Time t4, the phase signals P1 and P2, the ramp signal RAMP and the feedback signal SFB are all maintained at the low voltage VL.

Between Time t4 and Time t5, the phase signal P2 is at the high voltage VH, the ramp signal RAMP starts to rise, and the phase signal P1 and the feedback signal SFB are maintained at the low voltage VL simultaneously. At Time t5, the ramp signal RAMP is equal to the error amplification signal COMP, starting the generation of the pulse Pfb2 in the feedback signal SFB. The pulse Pfb2 in turn sets the phase signal P2 to the low voltage VL. Since the phase signals P1 and P2 are both at the low voltage VL, the ramp signal RAMP is reset to the low voltage VL. At Time t6, the pulse Pfb2 ends, and the phase signals P1 and P2 and the ramp signal RAMP are maintained at the low voltage VL.

The feedback circuit 802 may repeat the waveform from time t1 to t2 to generate the feedback signal SFB.

Figure 8:
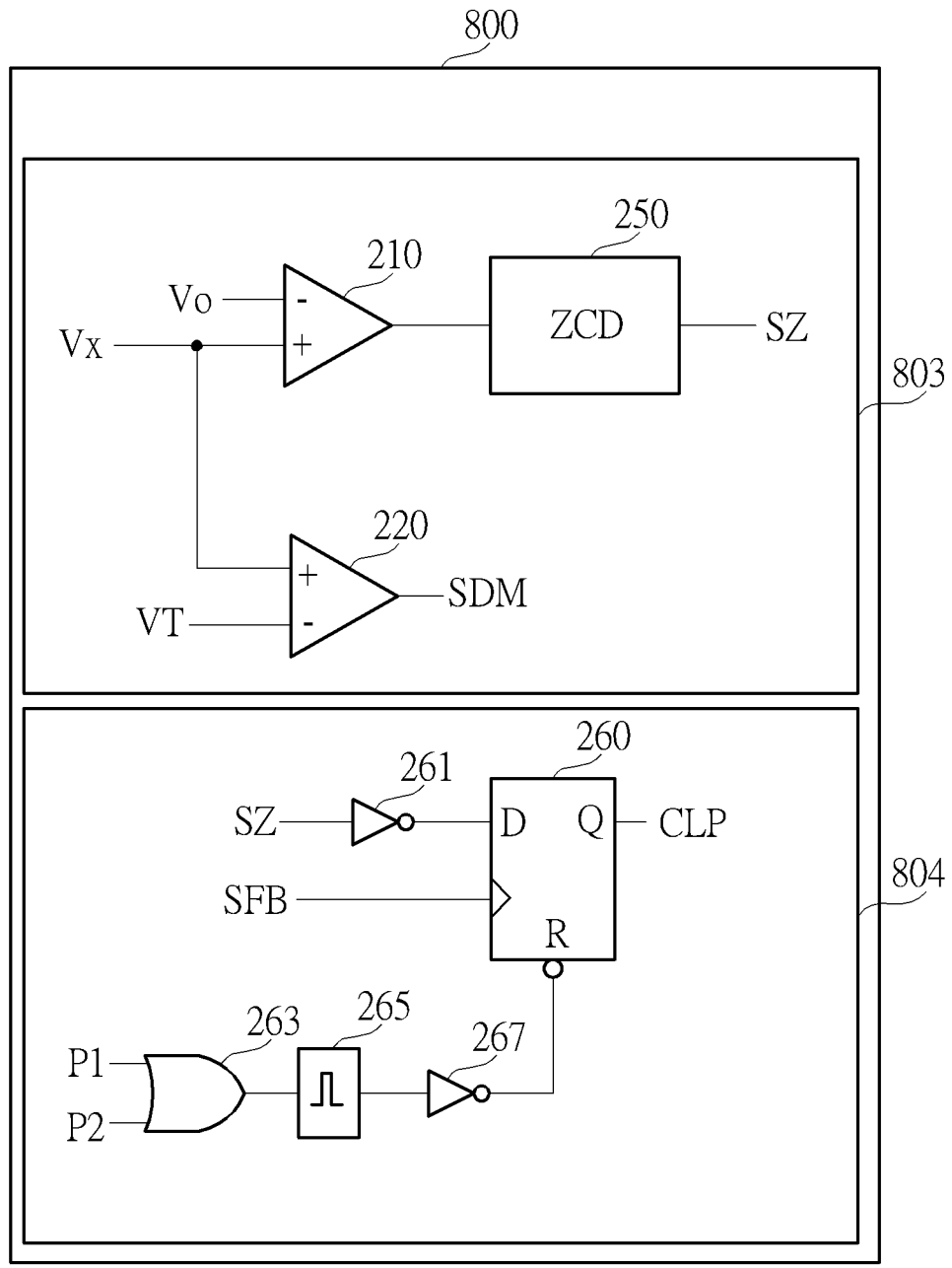
FIG. 8 is a circuit schematic of another portion of the control circuit in FIG. 1.

FIG. 8 is a schematic diagram of other parts of the control circuit 800. The control circuit 800 may further include a state detection circuit 803 and a closed loop circuit 804. The state detection circuit 803 may generate a zero-crossing signal SZ and a demagnetizing signal SDM. The zero-crossing signal SZ may indicate that the voltage across the inductor 60 passes 0 V, and the demagnetizing signal SDM may indicate that the switching voltage Vx (the voltage across the switches 30 and 40) exceeds a demagnetizing reference voltage VT. The closed-loop circuit 804 may generate the closed-loop signal CLP, and the closed-loop signal CLP may represent the operation mode of the power converter 1. When the closed-loop signal CLP is at a high voltage VH, the power converter 1 may operate in the regulated mode, and when the closed-loop signal CLP is at a low voltage VL, the power converter 1 may operate in the non-regulated mode.

The state detection circuit 803 may include comparators 210 and 220, and a zero-crossing detector (ZCD) 250. The comparator 210 includes a non-inverting terminal configured to receive the switching voltage Vx, an inverting terminal configured to receive the output voltage Vo, and an output terminal configured to output a comparison result of the switching voltage Vx and the output voltage Vo. The switching voltage Vx is the voltage at the first terminal of the inductor 60, and the output voltage Vo is the voltage at the second terminal of the inductor 60. When the switching voltage Vx exceeds the output voltage Vo, the comparator 210 may output the high voltage VH as the comparison result. When the switching voltage Vx is less than the output voltage Vo, the comparator 210 may output the low voltage VL as the comparison result. The zero-crossing detector 250 includes an input terminal configured to receive the comparison result of the switching voltage Vx and the output voltage Vo, and an output terminal configured to output the zero-crossing signal SZ. When 2 consecutive comparison results of the comparator 210 vary from the high voltage VH to the low voltage VL or from the low voltage VL to the high voltage VH, the zero-crossing detector 250 may generate a pulse having a predetermined width in the zero-crossing signal SZ. When the 2 consecutive comparison results of the comparator 210 are both the high voltage VH or both the low voltage VL, the zero-crossing detector 250 may set the zero-crossing signal SZ to the low voltage VL.

The comparator 220 includes a non-inverting terminal configured to receive the switching voltage Vx, an inverting terminal configured to receive the demagnetizing reference voltage VT, and an output terminal configured to output a comparison result of the switching voltage Vx and the demagnetizing reference voltage VT as a demagnetizing signal SDM. The demagnetizing reference voltage VT may be set to 0V. The switching voltage Vx may be equal to the voltage across switches 30 and 40. When the inductor 60 is fully demagnetized, the switching voltage Vx will reach a peak. When the switching voltage Vx exceeds the demagnetizing reference voltage VT, the comparator 220 may set the demagnetizing signal SDM to the high voltage VH. When the switching voltage Vx is less than the demagnetizing reference voltage VT, the comparator 220 may set the demagnetizing signal SDM to the low voltage VL.

The closed loop circuit 804 may include inverters 261 and 267, a flip-flop 260, a pulse generator 265 and an OR gate 263. The inverter 261 includes an input terminal configured to receive the zero-crossing signal SZ, and an output terminal configured to output an inverse of the zero-crossing signal SZ. The OR gate 263 includes a first input terminal configured to receive the phase signal P1, a second input terminal configured to receive the phase signal P2, and an output terminal configured to output the result of an OR operation of the phase signals P1 and P2. The pulse generator 265 includes an input terminal configured to receive the result of the OR operation of the output phase signals P1 and P2, and an output terminal configured to output a first pulse signal. The inverter 267 includes an input terminal configured to receive the first pulse signal, and an output terminal configured to output a first reset signal. The flip-flop 260 includes an input terminal configured to receive the inverse of the zero-crossing signal SZ, a clock terminal configured to receive the feedback signal SFB, a reset terminal configured to receive the first reset signal, and an output terminal configured to output the closed-loop signal CLP. The closed-loop signal CLP may be triggered by the feedback signal SFB and reset by the rising edge of the phase signal P1 or P2.

Figure 9:
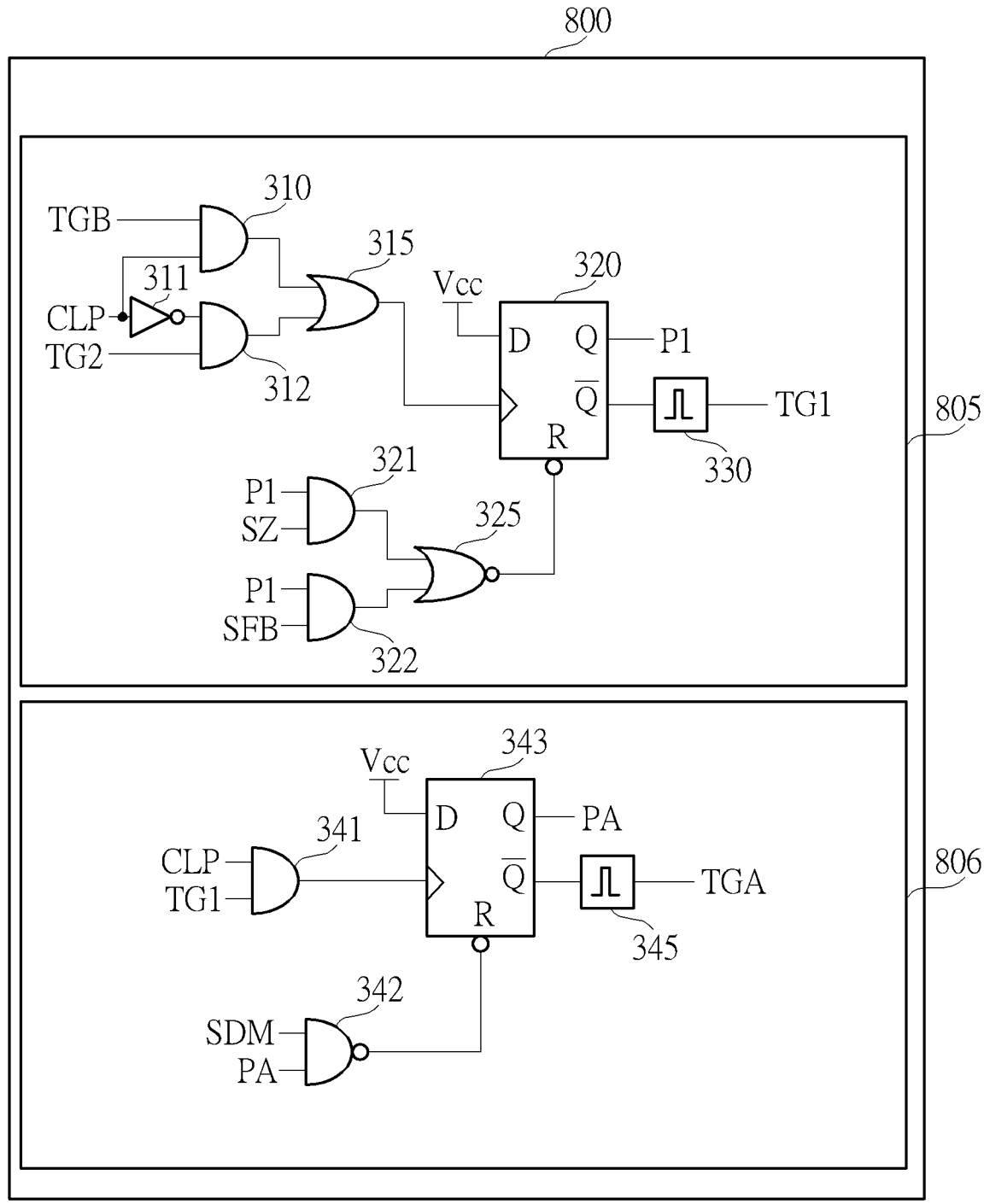
FIG. 9 is a circuit schematic of another portion of the control circuit in FIG. 1.
Figure 10:
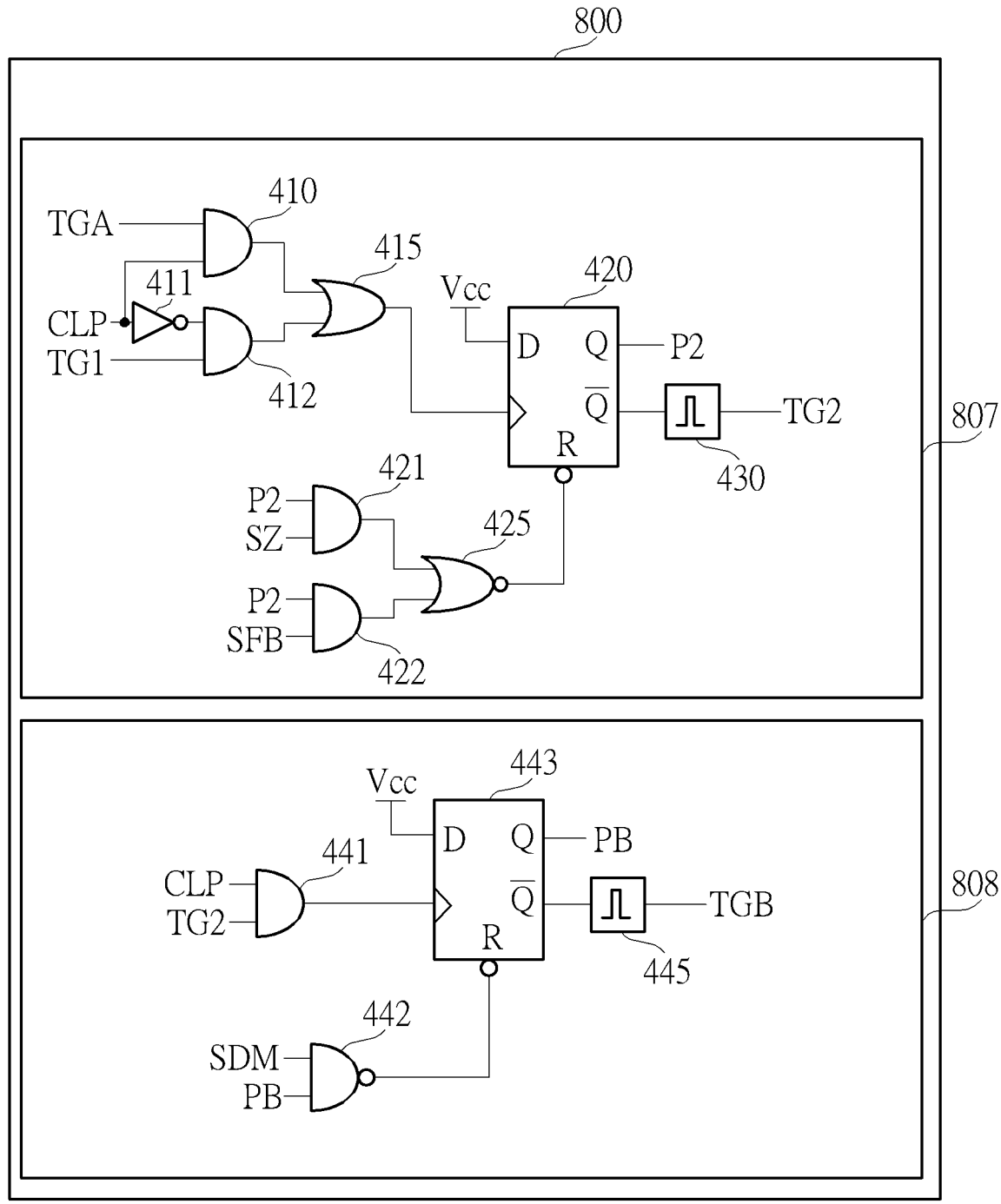
FIG. 10 is a circuit schematic of another portion of the control circuit in FIG. 1.

FIG. 9 and FIG. 10 are schematic diagrams of other parts of the control circuit 800. FIG. 9 shows that the control circuit 800 may further include phase circuits 805 and 806, and FIG. 10 shows that the control circuit 800 may further include phase circuits 807 and 808. The phase circuit 805 may generate the phase signal P1 and a trigger signal TG1, the phase circuit 806 may generate the phase signal PA and a trigger signal TGA, the phase circuit 807 may generate the phase signal P2 and a trigger signal TG2, and the phase circuit 808 may generate the phase signal PB and a trigger signal TGB. When the closed loop signal CLP is at the low voltage VL (non-regulated mode), the phase circuits 805 and 807 are enabled and the phase circuits 806 and 808 are disabled. When the closed-loop signal CLP is at the high voltage VH (regulated mode), the phase circuits 805 to 808 are all enabled.

The phase circuit 805 may include AND gates 310, 312, 321, and 322, an OR gate 315, a NOR gate 325, a flip-flop 320, a pulse generator 330, and an inverter 311. The AND gate 310 includes a first input terminal configured to receive the trigger signal TGB, a second input terminal configured to receive the closed-loop signal CLP, and an output terminal configured to output the result of an AND operation of the trigger signal TGA and the closed-loop signal CLP. The inverter 311 includes an input terminal configured to receive the closed-loop signal CLP, and an output terminal configured to output the inverse of the closed-loop signal CLP. The gate 312 includes a first input terminal configured to receive the inverse of the closed-loop signal CLP, a second input terminal configured to receive the trigger signal TG2, and an output terminal configured to output the result of an AND operation of the trigger signal TG2 and the inverse of the closed-loop signal CLP. The OR gate 315 includes a first input terminal coupled to the output terminal of the AND gate 310, a second input terminal coupled to the output terminal of the AND gate 312, and an output terminal configured to output the result of an OR operation. The AND gate 321 includes a first input terminal configured to receive the phase signal P1, a second input terminal configured to receive the zero-crossing signal SZ, and an output terminal configured to output the result of an AND operation of the phase signal P1 and the zero-crossing signal SZ. The AND gate 322 includes a first input terminal configured to receive the phase signal P1, a second input terminal configured to receive the feedback signal SFB, and an output terminal configured to output the result of an AND operation of the phase signal P1 and the feedback signal SFB. The NOR gate 325 includes a first input terminal coupled to the output terminal of the AND gate 321, a second input terminal coupled to the output terminal of the AND gate 322, and an output terminal configured to output the result of an NOR operation. The flip-flop 320 includes an input terminal configured to receive the power supply voltage Vcc, a clock terminal coupled to the output terminal of the OR gate 315 and configured to receive the output of the OR gate 315, and a reset terminal coupled to the output terminal of the NOR gate 325, an output terminal configured to output the phase signal P1, and an inverse output terminal configured to output the inverse of the phase signal P1. The pulse generator 330 includes an input terminal configured to receive the inverse of the phase signal P1, and an output terminal configured to output the trigger signal TG1.

The phase circuit 806 may include an AND gate 341, a NAND gate 342, a flip-flop 343 and a pulse generator 345. The AND gate 341 includes a first input terminal configured to receive the closed-loop signal CLP, a second input terminal configured to receive the trigger signal TG1, and an output terminal configured to output the result of an AND operation of the closed-loop signal CLP and the trigger signal TG1. The NAND gate 342 includes a first input terminal configured to receive the demagnetizing signal SDM, a second input terminal configured to receive the phase signal PA, and an output terminal configured to output the result of an NAND operation of the demagnetizing signal SDM and the phase signal PA. The flip-flop 343 includes an input terminal configured to receive the supply voltage Vcc, a clock terminal configured to receive the output of the AND gate 341, a reset terminal configured to receive the output of the NAND gate 342, an output terminal configured to output the output phase signal PA, and an inverse output terminal configured to output the inverse of the phase signal PA. The pulse generator 345 includes an input terminal configured to receive the inverse of the phase signal PA, and an output terminal configured to output the trigger signal TGA.

When the closed-loop signal CLP is at a low voltage VL, the AND gate 310 is disabled, the flip-flop 320 may be triggered by the trigger signal TG2 to generate the phase signal P1, and the phase signal P1 may be reset by the zero-crossing signal SZ. When the closed-loop signal CLP is at the high voltage VH, the AND gate 312 is disabled, the flip-flop 320 may be triggered by the trigger signal TGB to generate the phase signal P1, and the phase signal P1 may be reset by the zero-crossing signal SZ and/or the feedback signal SFB. The pulse generator 330 may be used to generate a dead-time delay for the trigger signal TG1. The longer the dead-time delay of the trigger signal TG1 is, the more the start time of the phase signal P2/PA will be delayed, increasing the dead-time delay between the end time of the phase signal P1 and the start time of the phase signal P2/PA.

When the closed-loop signal CLP is at the low voltage VL, the phase circuit 806 is disabled. When the closed-loop signal CLP is at the high voltage VH, the phase circuit 806 is enabled, the flip-flop 343 may be triggered by the trigger signal TG1 to generate the phase signal PA, and the phase signal PA may be reset by the demagnetizing signal SDM. The pulse generator 345 may be used to generate a dead-time delay in the trigger signal TGA. The longer the dead-time delay of the trigger signal TGA is, the more the start time of the phase signal P2 will be delayed, increasing the dead-time delay between the end time of the phase signal PA and the start time of the phase signal P2.

The phase circuit 807 may include AND gates 410, 412, 421, and 422, an OR gate 415, a NOR gate 425, a flip-flop 420, a pulse generator 430, and an inverter 411. The AND gate 410 includes a first input terminal configured to receive the trigger signal TGA, a second input terminal configured to receive the closed-loop signal CLP, and an output terminal configured to output the result of an AND operation of the trigger signal TGA and the closed-loop signal CLP. The inverter 411 includes an input terminal configured to receive the closed-loop signal CLP, and an output terminal configured to output the inverse of the closed-loop signal CLP. The gate 412 includes a first input terminal configured to receive the inverse of the closed-loop signal CLP, a second input terminal configured to receive the trigger signal TG1, and an output terminal configured to output the result of an AND operation of the trigger signal TG1 and the inverse of the closed-loop signal CLP. The OR gate 415 includes a first input terminal coupled to the output terminal of the AND gate 410, a second input terminal coupled to the output terminal of the AND gate 412, and an output terminal configured to output the result of an OR operation. The AND gate 421 includes a first input terminal configured to receive the phase signal P2, a second input terminal configured to receive the zero-crossing signal SZ, and an output terminal configured to output the result of an AND operation of the phase signal P2 and the zero-crossing signal SZ. The AND gate 422 includes a first input terminal configured to receive the phase signal P2, a second input terminal configured to receive the feedback signal SFB, and an output terminal configured to output the result of an AND operation of the phase signal P2 and the feedback signal SFB. The NOR gate 425 includes a first input terminal coupled to the output terminal of the AND gate 421, a second input terminal coupled to the output terminal of the AND gate 422, and an output terminal configured to output the result of an NOR operation. The flip-flop 420 includes an input terminal configured to receive the supply voltage Vcc, a clock terminal configured to receive the output of the OR gate 415, a reset terminal configured to receive the output of the NOR gate 425, an output terminal configured to output the output phase signal P2, and an inverse output terminal configured to output the inverse of the phase signal P2. The pulse generator 430 includes an input terminal configured to receive the inverse of the phase signal P2, and an output terminal configured to output the trigger signal TG2.

The phase circuit 808 may include an AND gate 441, a NAND gate 442, a flip-flop 443 and a pulse generator 445. The AND gate 441 includes a first input terminal configured to receive the closed-loop signal CLP, a second input terminal configured to receive the trigger signal TG2, and an output terminal configured to output the result of an AND operation of the closed-loop signal CLP and the trigger signal TG2. The NAND gate 442 includes a first input terminal configured to receive the demagnetizing signal SDM, a second input terminal configured to receive the phase signal PB, and an output terminal configured to output the result of an NAND operation of demagnetizing signal SDM and the phase signal PB. The flip-flop 443 includes a data input terminal configured to receive the power supply voltage Vcc, a clock terminal configured to receive the output of the AND gate 441, a reset terminal configured to receive the output of the NAND gate 442, an output terminal configured to output the phase signal PB, and an inverse output terminal configured to output the inverse of the phase signal PB. The pulse generator 445 includes an input terminal configured to receive the inverse of the phase signal PB, and an output terminal configured to output the trigger signal TGB.

When the closed-loop signal CLP is at a low voltage VL, the AND gate 410 is disabled, the flip-flop 420 may be triggered by the trigger signal TG1 to generate the phase signal P2, and the phase signal P2 may be reset by the zero-crossing signal SZ. When the closed-loop signal CLP is at the high voltage VH, the AND gate 412 is disabled, the flip-flop 420 may be triggered by the trigger signal TGA to generate the phase signal P2, and the phase signal P2 may be reset by the zero-crossing signal SZ and/or the feedback signal SFB. The pulse generator 430 may be used to generate a dead-time delay for the trigger signal TG2. The longer the dead-time delay of the trigger signal TG2 is, the more the start time of the phase signal P1/PB will be delayed, increasing the dead-time delay between the end time of the phase signal P2 and the start time of the phase signal P1/PB.

When the closed-loop signal CLP is at the low voltage VL, the phase circuit 808 is disabled. When the closed-loop signal CLP is at the high voltage VH, the phase circuit 808 is enabled, the flip-flop 443 may be triggered by the trigger signal TG2 to generate the phase signal PB, and the phase signal PB may be reset by the demagnetizing signal SDM. The pulse generator 445 may be used to generate the dead-time delay of the trigger signal TGB. The longer the dead-time delay of the trigger signal TGB is, the more the start time of the phase signal PB will be delayed, increasing the dead-time delay between the end time of the phase signal PB and the start time of the phase signal P1.

When the power converter 1 is in a light load condition, the control circuit 800 may further set the pulse generators 330, 345, 440 and 445 to increase the dead-time delays for the trigger signals TG1, TGA, TG2 and TGB, thereby increasing the OFF times of the switches 10, 20, 30 and 40, thereby saving power.

The embodiments of FIGS. 1 to 10 are used to control the power converter 1 to operate in the non-regulated mode or the regulated mode, preventing the load from being damaged while enhancing system efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power converter comprising:
   a first switch comprising a control terminal, a first terminal configured to receive an input voltage, and a second terminal;
   a second switch comprising a control terminal, a first terminal coupled to the second terminal of the first switch, and a second terminal;
   a third switch comprising a control terminal, a first terminal coupled to the second terminal of the second switch, and a second terminal;
   a fourth switch comprising a control terminal, a first terminal coupled to the second terminal of the third switch, and a second terminal coupled to a ground terminal;
   a flying capacitor comprising a first terminal coupled to the second terminal of the first switch, and a second terminal coupled to the second terminal of the third switch;
   an inductor comprising a first terminal coupled to the second terminal of the second switch, and a second terminal;
   an output capacitor comprising a first terminal coupled to the second terminal of the inductor and configured to output an output voltage, and a second terminal coupled to the ground terminal; and
   a control circuit coupled to the control terminal of the first switch, the control terminal of the second switch, the control terminal of the third switch and the control terminal of the fourth switch, and configured to switch the first switch, the second switch, the third switch and the fourth switch according to a resonant frequency when the input voltage is less than an input threshold voltage, and switch the first switch, the second switch, the third switch and the fourth switch according to a regulated frequency exceeding the resonant frequency when the input voltage exceeds the input threshold voltage;

wherein the flying capacitor and the inductor form a resonant circuit having the resonant frequency;

when the input voltage exceeds the input threshold voltage, and the control circuit is further configured to turn off the first switch or the second switch before an inductor current of the inductor reaches 0A during magnetizing the inductor.

2. The power converter of claim 1, wherein the output voltage is less than or equal to half the input voltage.

3. The power converter of claim 1, wherein when the input voltage is less than the input threshold voltage, the control circuit is further configured to switch the first switch, the second switch, the third switch and the fourth switch when an inductor current of the inductor is 0A.

4. The power converter of claim 1, wherein when the input voltage exceeds the input threshold voltage, the control circuit is configured to reduce an ON time of the first switch or the second switch.

5. The power converter of claim 1, wherein when the power converter is in a light load condition, the control circuit is further configured to extend OFF times of the first switch, the second switch, the third switch and the fourth switch.

6. The power converter of claim 1, wherein when the input voltage exceeds the input threshold voltage, the control circuit is further configured to turn on the third switch and the fourth switch after turning off the first switch or the second switch to demagnetize the inductor.

7. The power converter of claim 6, wherein when the input voltage exceeds the input threshold voltage, the control circuit is further configured to turn off the third switch or the fourth switch when the inductor current of the inductor reaches 0A during demagnetizing the inductor.

8. The power converter of claim 1, wherein:
the flying capacitor and the output capacitor are charged via the inductor when the first switch and the third switch are turned on; and
the flying capacitor charges the output capacitor via the inductor when the second switch and the fourth switch are turned on.

9. The power converter of claim 1, wherein:
the output voltage is a divided voltage of the input voltage when the input voltage is less than the input threshold voltage; and
the power converter is configured to operate in a regulated mode when the input voltage exceeds the input threshold voltage.

10. The power converter of claim 1, wherein the power converter is operated in a discontinuous conduction mode (DCM).

11. The power converter of claim 1, wherein the control circuit comprises:
a first phase circuit configured to generate a first phase signal and a first trigger signal according to a third trigger signal, a fourth trigger signal, a closed-loop signal, a zero-cross signal and a feedback signal;
a second phase circuit coupled to the first phase circuit and configured to generate a second phase signal and a second trigger signal according to the closed-loop signal, the first trigger signal and a demagnetizing signal;
a third phase circuit coupled to the second phase circuit and configured to generate a third phase signal and the third trigger signal;
a fourth phase circuit coupled to the third phase circuit and the first phase circuit and configured to generate a fourth phase signal and the fourth trigger signal according to the third trigger signal, the closed-loop signal and the demagnetizing signal;
a signal generation circuit coupled to the first phase circuit, the second phase circuit, the third phase circuit and the fourth phase circuit, and configured to generate a first switch signal, a second switch signal, a third switch signal and a fourth switch signal according to the first phase signal, the second phase signal, the third phase signal, and the fourth phase signal, the first phase signal, the second phase signal, the third phase signal, and the fourth phase signal being used to switch the first switch, the second switch, the third switch and the fourth switch, respectively;
a feedback circuit coupled to the first phase circuit, the third phase circuit and the first terminal of the output capacitor, and configured to generate the feedback signal according to the first phase signal, the third phase signal, the output voltage, a reference voltage and the closed-loop signal;
a state detection circuit coupled to the first terminal of the output capacitor and the first terminal of the inductor, and configured to generate the zero-crossing signal and the demagnetizing signal according to the output voltage, a demagnetizing reference voltage and a switching voltage at the first terminal of the inductor; and
a closed-loop circuit coupled to the state detection circuit, the feedback circuit, the first phase circuit and the third phase circuit, and configured to generate the closed-loop signal according to the zero-crossing signal, the feedback signal, the first phase signal and the first phase signal and the third phase signal.

12. The power converter of claim 11, wherein:
the first phase circuit comprises:
a first AND gate comprising:
a first input terminal configured to receive the fourth trigger signal;
a second input terminal configured to receive the closed-loop signal; and
an output terminal;
a first inverter comprising:
an input terminal configured to receive the closed-loop signal; and
an output terminal configured to output an inverse of the closed-loop signal;
a second AND gate comprising:
a first input terminal configured to receive the inverse of the closed-loop signal;
a second input terminal configured to receive the third trigger signal; and
an output terminal;
a first OR gate comprising:
a first input terminal coupled to the output terminal of the first AND gate;
a second input terminal coupled to the output terminal of the second AND gate; and
an output terminal;
a third AND gate comprising:

a first input terminal configured to receive the first phase signal;
a second input terminal configured to receive the zero-crossing signal; and
an output terminal;
a fourth AND gate comprising:
a first input terminal configured to receive the first phase signal;
a second input terminal configured to receive the feedback signal; and
an output terminal;
a first NOR gate comprising:
a first input terminal coupled to the output terminal of the third AND gate;
a second input terminal coupled to the output terminal of the fourth AND gate; and
an output terminal;
a first flip-flop comprising:
an input terminal configured to receive a supply voltage;
a clock terminal coupled to the output terminal of the first OR gate;
a reset terminal coupled to the output terminal of the first NOR gate;
an output terminal configured to output the first phase signal; and
an inverse output terminal configured to output an inverse of the first phase signal; and
a first pulse generator comprising:
an input terminal configured to receive the inverse of the first phase signal; and
an output terminal configured to output the first trigger signal; and
the second phase circuit comprising:
a fifth AND gate comprising:
a first input terminal configured to receive the closed-loop signal;
a second input terminal configured to receive the first trigger signal; and
an output terminal;
a first NAND gate comprising:
a first input terminal configured to receive the demagnetizing signal;
a second input terminal configured to receive the second phase signal; and
an output terminal;
a second flip-flop comprising:
an input terminal configured to receive the supply voltage;
a clock terminal coupled to the output terminal of the fifth AND gate;
a reset terminal coupled to the output terminal of the first NAND gate;
an output terminal configured to output the second phase signal; and
an inverse output terminal configured to output an inverse of the second phase signal; and
a second pulse generator comprising:
an input terminal configured to receive the inverse of the second phase signal; and
an output terminal configured to output the second trigger signal.

13. The power converter of claim 11, wherein:
The third phase circuit comprising:
a first AND gate comprising:
a first input terminal configured to receive the second trigger signal;

a second input terminal configured to receive the closed-loop signal; and
an output terminal;
a first inverter comprising:
an input terminal configured to receive the closed-loop signal; and
an output terminal configured to output an inverse of the closed-loop signal;
a second AND gate comprising:
a first input terminal configured to receive the inverse of the closed-loop signal;
a second input terminal configured to receive the first trigger signal; and
an output terminal;
a first OR gate comprising:
a first input terminal coupled to the output terminal of the first AND gate;
a second input terminal coupled to the output terminal of the second AND gate; and
an output terminal;
a third AND gate comprising:
a first input terminal configured to receive the third phase signal;
a second input terminal configured to receive the zero-crossing signal; and
an output terminal;
a fourth AND gate comprising:
a first input terminal configured to receive the third phase signal;
a second input terminal configured to receive the feedback signal; and
an output terminal;
a first NOR gate comprising:
a first input terminal coupled to the output terminal of the third AND gate;
a second input terminal coupled to the output terminal of the fourth AND gate; and
an output terminal;
a first flip-flop comprising:
an input terminal configured to receive a supply voltage;
a clock terminal coupled to the output terminal of the first OR gate;
a reset terminal coupled to the output terminal of the first NOR gate;
an output terminal configured to output the third phase signal; and
an inverse output terminal configured to output an inverse of the third phase signal; and
a first pulse generator comprising:
an input terminal configured to receive the inverse of the third phase signal; and
an output terminal configured to output the third trigger signal; and
the fourth phase circuit comprising:
a fifth AND gate comprising:
a first input terminal configured to receive the closed-loop signal;
a second input terminal configured to receive the third trigger signal; and
an output terminal;
a first NAND gate comprising:
a first input terminal configured to receive the demagnetizing signal;
a second input terminal configured to receive the fourth phase signal; and
an output terminal;

a second flip-flop comprising:
  an input terminal configured to receive the supply voltage;
  a clock terminal coupled to the output terminal of the fifth AND gate;
  a reset terminal coupled to the output terminal of the first NAND gate;
  an output terminal configured to output the fourth phase signal; and
  an inverse output terminal configured to output an inverse of the fourth phase signal; and
a second pulse generator comprising:
  an input terminal configured to receive the inverse of the fourth phase signal; and
  an output terminal configured to output the fourth trigger signal.

14. The power converter of claim 11, wherein:
the signal generation circuit comprising:
  a first buffer comprising:
    an input terminal configured to receive the first phase signal; and
    an output terminal configured to output the first switch signal:
  a second buffer comprising:
  an input terminal configured to receive the second phase signal; and
    an output terminal configured to output the second switch signal:
  a first OR gate comprising:
  a first input terminal configured to receive the first phase signal;
    a second input terminal configured to receive the second phase signal;
    a third input terminal configured to receive the fourth phase signal; and
    an output terminal:
  a third buffer comprising:
    an input terminal coupled to the output terminal of the first OR gate; and
    an output terminal configured to output the third switch signal:
  a second OR gate comprising:
    a first input terminal configured to receive the third phase signal:
    a second input terminal configured to receive the second phase signal;
    a third input terminal configured to receive the fourth phase signal; and
    an output terminal; and
  a fourth buffer comprising:
    an input coupled to the output terminal of the second OR gate; and
    an output terminal configured to output the fourth switch signal.

15. The power converter of claim 11, wherein:
the feedback circuit comprising:
  a first NOR gate comprising:
    a first input terminal configured to receive the first phase signal;
    a second input terminal configured to receive the third phase signal; and
    an output terminal:
  a current source comprising:
    a first terminal coupled to a supply terminal configured to receive a supply voltage; and
    a second terminal;
  a transistor comprising:
    a control terminal coupled to the output terminal of the first NOR gate:
    a first terminal coupled to the second terminal of the current source; and
    a second terminal coupled to a ground terminal;
  a first capacitor comprising:
    a first terminal coupled to the first terminal of the transistor; and
    a second terminal coupled to the ground terminal;
  a first resistor comprising:
    a first terminal configured to receive the output voltage; and
    a second terminal;
  a second resistor comprising:
    a first terminal coupled to the second terminal of the first resistor; and
    a second terminal coupled to the ground terminal;
  a third resistor comprising:
    a first terminal configured to receive the reference voltage; and
    a second terminal;
  a fourth resistor comprising:
    a first terminal coupled to the second terminal of the third resistor; and
    a second terminal;
  a switch comprising:
    a control terminal configured to receive the closed-loop signal:
    a first terminal coupled to the second terminal of the third resistor; and
    a second terminal coupled to the ground terminal;
  an error amplifier comprising:
    an inverting terminal coupled to the second terminal of the first resistor;
    a non-inverting terminal coupled to the second terminal of the third resistor; and
    an output terminal:
  a fifth resistor comprising:
    a first terminal coupled to the output terminal of the error amplifier; and
    a second terminal;
  a second capacitor comprising:
    a first terminal coupled to the second terminal of the fifth resistor; and
    a second terminal coupled to the ground terminal; and
  a comparator comprising:
    a non-inverting terminal coupled to the first terminal of the first capacitor:
    an inverting terminal coupled to the first terminal of the fifth resistor; and
    an output terminal configured to output the feedback signal.

16. The power converter of claim 11, wherein:
the state detection circuit comprising:
  a first comparator comprising:
    a non-inverting terminal configured to receive the switching voltage;
    an inverting terminal configured to receive the output voltage; and
    an output terminal:
  a zero-crossing detector comprising:
    an input terminal coupled to the output terminal of the first comparator; and
    an output terminal configured to output the zero-crossing signal; and
  a second comparator comprising:

a non-inverting terminal configured to receive the switching voltage;
an inverting input configured to receive the demagnetizing reference voltage; and
an output terminal configured to output a demagnetizing signal; and
the closed-loop circuit comprising:
a first inverter comprising:
an input configured to receive the zero-crossing signal; and
an output terminal configured to output an inverse of the zero-crossing signal:
a first OR gate comprising:
a first input terminal configured to receive the first phase signal;
a second input terminal configured to receive the third phase signal; and
an output terminal:
a second pulse generator comprising:
an input terminal coupled to the output terminal of the first OR gate; and
an output terminal configured to output a first pulse signal:
a second inverter comprising:
an input terminal configured to receive the first pulse signal; and
an output terminal configured to output a reset signal; and
a flip-flop comprising:
an input terminal configured to receive the inverse of the zero-crossing signal:
a clock terminal configured to receive the feedback signal:
a reset terminal configured to receive the reset signal; and
an output terminal configured to output the closed-loop signal.

17. A method of controlling a power converter, the power converter comprising a first switch, a second switch, a third switch, a fourth switch, a flying capacitor, an inductor, an output capacitor and a control circuit, the first switch comprising a control terminal, a first terminal configured to receive an input voltage, and a second terminal, the second switch comprising a control terminal, a first terminal coupled to the second terminal of the first switch, and a second terminal, the third switch comprising a control terminal, a first terminal coupled to the second terminal of the second switch, and a second terminal, the fourth switch comprising a control terminal, a first terminal coupled to the second terminal of the third switch, and a second terminal coupled to a ground terminal, the flying capacitor comprising a first terminal coupled to the second terminal of the first switch, and a second terminal coupled to the second terminal of the third switch, the inductor comprising a first terminal coupled to the second terminal of the second switch, and a second terminal, the output capacitor comprising a first terminal coupled to the second terminal of the inductor and configured to output an output voltage, and a second terminal coupled to the ground terminal, and the control circuit coupled to the control terminal of the first switch, the control terminal of the second switch, the control terminal of the third switch and the control terminal of the fourth switch, the method comprising:
the control circuit switching the first switch, the second switch, the third switch and the fourth switch according to a resonant frequency when the input voltage is less than an input threshold voltage;
the control circuit switching the first switch, the second switch, the third switch and the fourth switch according to a regulated frequency exceeding the resonant frequency when the input voltage exceeds the input threshold voltage; and
the control circuit turning off the first switch or the second switch before an inductor current of the inductor reaches 0A during magnetizing the inductor when the input voltage exceeds the input threshold voltage;
wherein if the flying capacitor is coupled to the inductor, the flying capacitor and the inductor form a resonant circuit having the resonant frequency.

18. The method of claim 17, wherein the control circuit switching the first switch, the second switch, the third switch and the fourth switch according to the resonant frequency when the input voltage is less than the input threshold voltage further comprises:
the control circuit switching the first switch, the second switch, the third switch and the fourth switch when an inductor current of the inductor is 0A.

19. The method of claim 17, wherein the control circuit switching the first switch, the second switch, the third switch and the fourth switch according to the regulated frequency exceeding the resonant frequency when the input voltage exceeds the input threshold voltage further comprises:
the control circuit reducing an ON time of the first switch or the second switch.

20. The method of claim 17, wherein the control circuit switching the first switch, the second switch, the third switch and the fourth switch according to the regulated frequency exceeding the resonant frequency when the input voltage exceeds the input threshold voltage further comprises:
when the power converter is in a light load condition, the control circuit further extending OFF times of the first switch, the second switch, the third switch and the fourth switch.

21. The method of claim 17, wherein the control circuit switching the first switch, the second switch, the third switch and the fourth switch according to the regulated frequency exceeding the resonant frequency when the input voltage exceeds the input threshold voltage further comprises:
charging the flying capacitor and the output capacitor via the inductor when the first switch and the third switch are turned on; and
the flying capacitor charging the output capacitor via the inductor when the second switch and the fourth switch are turned on.

22. The method of claim 17, wherein:
the control circuit switching the first switch, the second switch, the third switch and the fourth switch according to the resonant frequency when the input voltage is less than the input threshold voltage comprises: configuring the output voltage as a divided voltage of the input voltage; and
the control circuit switching the first switch, the second switch, the third switch and the fourth switch according to the regulated frequency exceeding the resonant frequency when the input voltage exceeds the input threshold voltage comprises: operating the power converter in a regulated mode.

23. The method of claim 17, wherein the control circuit switching the first switch, the second switch, the third switch and the fourth switch according to the regulated frequency exceeding the resonant frequency when the input voltage exceeds the input threshold voltage further comprises:

the control circuit turning on the third switch and the fourth switch after turning off the first switch or the second switch to demagnetize the inductor.

24. The method of claim 23, wherein the control circuit switching the first switch, the second switch, the third switch and the fourth switch according to the regulated frequency exceeding the resonant frequency when the input voltage exceeds the input threshold voltage further comprises:

the control circuit turning off the third switch or the fourth switch when the inductor current of the inductor reaches 0A during demagnetizing the inductor.

* * * * *